(12) United States Patent
Brizendine et al.

(10) Patent No.: US 10,041,553 B2
(45) Date of Patent: Aug. 7, 2018

(54) CLIP FOR USE IN A DISC BRAKE ASSEMBLY AND DISC BRAKE ASSEMBLY INCLUDING SUCH A CLIP

(71) Applicant: Kelsey-Hayes Company, Livonia, MI (US)

(72) Inventors: Chad Brizendine, Livonia, MI (US); Manuel Barbosa, Livonia, MI (US); Kraig E. Gerber, Livonia, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 14/898,263

(22) PCT Filed: Jun. 19, 2014

(86) PCT No.: PCT/US2014/043117
§ 371 (c)(1),
(2) Date: Dec. 14, 2015

(87) PCT Pub. No.: WO2014/205177
PCT Pub. Date: Dec. 24, 2014

(65) Prior Publication Data
US 2016/0131210 A1    May 12, 2016

Related U.S. Application Data

(60) Provisional application No. 61/836,957, filed on Jun. 19, 2013.

(51) Int. Cl.
*F16D 65/097*    (2006.01)
*F16D 55/226*    (2006.01)

(52) U.S. Cl.
CPC ....... *F16D 65/0978* (2013.01); *F16D 55/226* (2013.01); *F16D 65/0972* (2013.01)

(58) Field of Classification Search
CPC . F16D 65/0978; F16D 65/0972; F16D 55/226
(Continued)

(56) References Cited

U.S. PATENT DOCUMENTS

| | | |
|---|---|---|
| 4,222,465 A | 9/1980 | Haraikawa et al. |
| 4,538,708 A | 9/1985 | Seki |

(Continued)

FOREIGN PATENT DOCUMENTS

| | | |
|---|---|---|
| JP | 8-261261 A | 8/1996 |
| JP | 2000249175 A | 9/2000 |

(Continued)

OTHER PUBLICATIONS

PCT International Search Report, Application No. PCT/US2014/043117, dated Oct. 7, 2014.

(Continued)

*Primary Examiner* — Thomas J Williams
*Assistant Examiner* — Mariano Sy
(74) *Attorney, Agent, or Firm* — MacMillan, Sobanski & Todd, LLC

(57) ABSTRACT

A brake clip adapted for use in a disc brake assembly comprises a brake clip configured to be disposed between an anchor bracket and at least one brake pad of the disc brake assembly. The brake clip has at least one tab extending therefrom which is configured to initially contact and prevent the at least one brake pad from falling free prior to installation of the disc brake assembly on a vehicle.

26 Claims, 5 Drawing Sheets

(58) Field of Classification Search
USPC .................................................... 188/73.38
See application file for complete search history.

(56) References Cited

U.S. PATENT DOCUMENTS

| | | | |
|---|---|---|---|
| 5,377,790 A | 1/1995 | Tsuruta | |
| 5,687,817 A * | 11/1997 | Kobayashi | F16D 65/097 188/72.3 |
| 5,699,882 A | 12/1997 | Ikegami et al. | |
| 5,901,815 A | 5/1999 | Kobayashi et al. | |
| 6,378,666 B1 * | 4/2002 | Yoko | F16D 65/0972 188/73.36 |
| 7,219,773 B2 * | 5/2007 | Ono | F16D 65/0971 188/250 E |
| 7,784,591 B2 * | 8/2010 | Franz | F16D 65/0972 188/73.36 |
| 8,439,171 B2 * | 5/2013 | Kaneko | F16D 65/0972 188/72.3 |
| 9,062,729 B2 * | 6/2015 | Chelaidite | F16D 65/092 |
| 9,267,559 B2 * | 2/2016 | Boyle | F16D 65/0006 |
| 2004/0144602 A1 | 7/2004 | Ono | |
| 2005/0236236 A1 * | 10/2005 | Farooq | F16D 65/0974 188/73.38 |
| 2012/0205205 A1 * | 8/2012 | Lethorn | F16D 65/0977 188/234 |
| 2012/0222925 A1 * | 9/2012 | Kaneko | F16D 65/0977 188/73.38 |
| 2013/0192938 A1 * | 8/2013 | Miller | F16D 65/0978 188/73.31 |

FOREIGN PATENT DOCUMENTS

| | | |
|---|---|---|
| JP | 2005315423 A | 11/2005 |
| JP | 2007280005 A | 10/2007 |

OTHER PUBLICATIONS

Chinese First Office Action, Application No. CN 201480041869.9, dated Mar. 20, 2017.

* cited by examiner

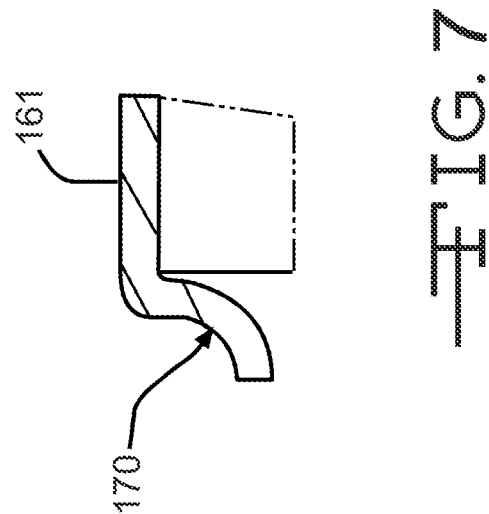
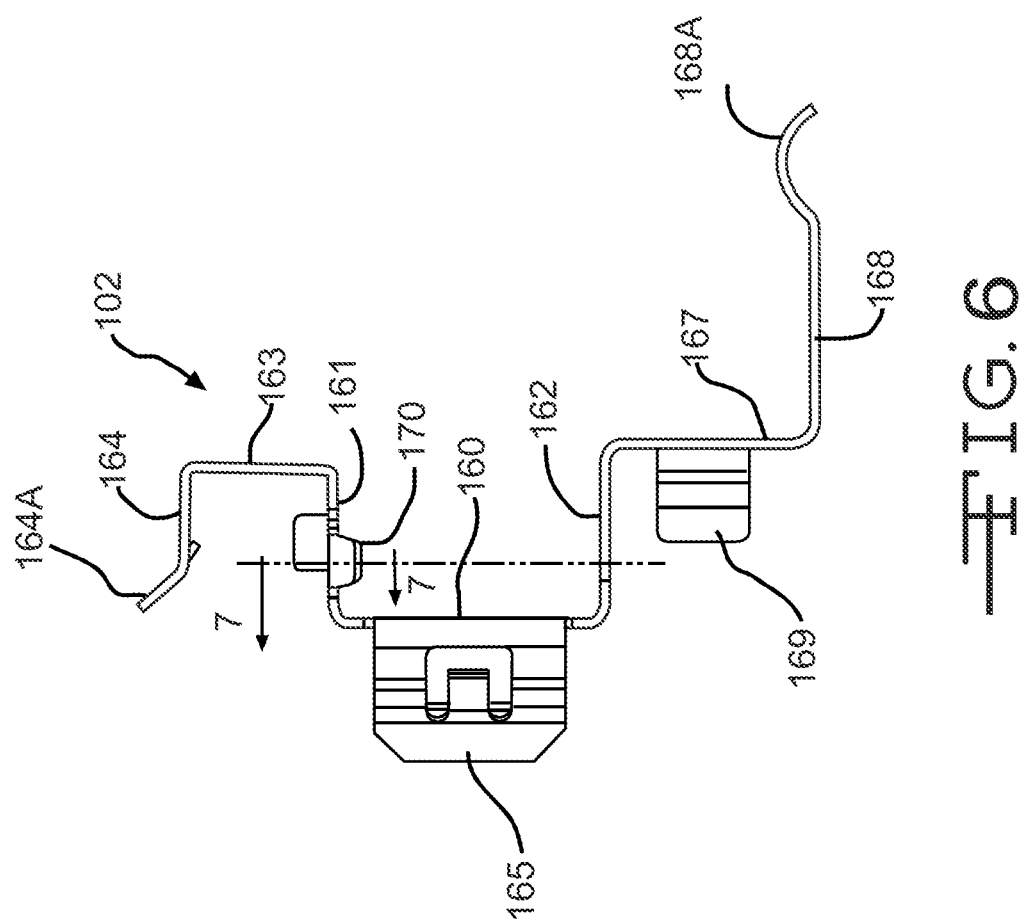

CLIP FOR USE IN A DISC BRAKE ASSEMBLY AND DISC BRAKE ASSEMBLY INCLUDING SUCH A CLIP

BACKGROUND OF THE INVENTION

This invention relates in general to vehicle disc brake assemblies and in particular to an improved structure for a brake clip for use in a brake pad assembly of a disc brake assembly and a disc brake assembly including such a brake clip.

Most vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are actuated by hydraulic or pneumatic pressure generated when an operator of the vehicle depresses a brake pedal. The structures of these drum brake assemblies and disc brake assemblies, as well as the actuators therefore, are well known in the art.

A typical disc brake assembly includes a brake rotor which is secured to a wheel of the vehicle for rotation therewith. The disc brake assembly further includes a caliper assembly that is slidably supported on pins secured to an anchor bracket. The anchor bracket is secured to a non-rotatable component of the vehicle, such as the axle flange or steering knuckle, which is connected to the vehicle frame. The caliper assembly includes a pair of brake pads which are disposed on opposite sides of the brake rotor. The brake pads are connected to one or more hydraulically or pneumatically actuated pistons for movement between a non-braking position and a braking position, wherein they are moved into frictional engagement with the opposed braking surfaces of the brake rotor. For example, when an operator of the vehicle depresses the brake pedal, the piston urges the brake pads from the non-braking position to the braking position so as to frictionally engage the opposed braking surfaces of the brake rotor and thereby slow or stop rotation of the associated wheel of the vehicle.

When the disc brake assembly is not actuated, the brake pads are normally spaced apart from the opposite sides of the rotor. Because they are not positively engaged with the rotor, the brake pads are free to move relative to other brake and vehicle components during vehicle operation. As a result, vehicle induced vibration loads are known to cause undesirable rattle or other noises between the brake pads and the other brake components. To prevent this from occurring, it is known to provide a brake clip between the anchor bracket and the brake pad.

A typical brake clip is embodied as a spring metal member having outwardly extending legs or walls which spring load each of the brake pads against a non-moving component of the disc brake assembly. The brake clip exerts a relatively small force against the associated brake pad which prevents it from rattling while limiting pad sliding resistance to an optimum level when the disc brake assembly is disengaged. However, during shipping and prior to the installation of the disc brake assembly on a vehicle having the rotor, there is nothing to prevent one or both of the brake pads from moving into the open space created by the rotor not being present and possibly falling out of the disc brake assembly. Thus, it would be desirable to provide a brake clip that prevents the brake pads from falling out of the disc brake assembly prior to installation on the vehicle.

SUMMARY OF THE INVENTION

This invention relates to a brake clip for use in a brake pad assembly of a disc brake assembly and a disc brake assembly including such a brake clip.

According to one embodiment, the disc brake assembly may comprise, individually and/or in combination, one or more of the following features: an anchor bracket configured to be secured to a component of a vehicle; at least one brake pad configured to be carried by the anchor bracket; and at least one brake clip configured to be disposed between the anchor bracket and the at least one brake pad of the disc brake assembly, the brake clip having at least one tab extending therefrom which is configured to initially contact and prevent the at least one brake pad from falling free prior to installation of the disc brake assembly on a vehicle.

According to this embodiment, after installation of the disc brake assembly on the vehicle the at least one tab is configured to be one of removed or deformed so as not affect the performance of the disc brake assembly According to this embodiment, the at least one brake pad includes a backing plate and the at least one tab is configured to initially contact a portion of the backing plate to prevent the at least one brake pad from falling free prior to installation of the disc brake assembly on a vehicle and wherein after installation of the disc brake assembly on the vehicle the at least one tab is configured to be contacted by the portion of the backing plate and be deformed thereby as the brake pad wears so as not affect the performance of the disc brake assembly.

According to this embodiment, the anchor bracket includes a channel and the at least one brake clip is disposed in the channel of the anchor bracket.

According to this embodiment, the channel has a generally U-shaped portion and the at least one brake clip has a complimentary generally U-shaped portion.

According to this embodiment, the at least one tab extends from the generally U-shaped portion of the at least one brake clip.

According to this embodiment, the at least one brake clip includes at least one retention member provided thereon, the at least one retention member being configured to engage a portion of the anchor bracket to assist in securing the at least one brake clip to the anchor bracket.

According to this embodiment, the at least one brake pad includes a backing plate having an outwardly extending guide rail and the at least one tab is configured to initially contact a portion of the guide rail of the backing plate to prevent the at least one brake pad from falling free prior to installation of the disc brake assembly on a vehicle and wherein after installation of the disc brake assembly on the vehicle the at least one tab is configured to be contacted by the portion of the guide rail backing plate and be deformed thereby as the brake pad wears so as not affect the performance of the disc brake assembly.

According to this embodiment, the at least one brake pad includes a pair of the brake clips disposed between the anchor bracket and the at least one brake pad of the disc brake assembly, each of the pair of brake clips having at least one tab extending therefrom which is configured to initially contact and prevent the at least one brake pad from falling free prior to installation of the disc brake assembly on a vehicle and wherein after installation of the disc brake assembly on the vehicle the at least one tab is configured to be deformed as the brake pad wears so as not affect the performance of the disc brake assembly.

According to another embodiment, the disc brake assembly may comprise, individually and/or in combination, one or more of the following features: an anchor bracket configured to be secured to a component of a vehicle, the anchor bracket having at least one channel; at least one brake pad configured to be carried by the anchor bracket, the at least one brake pad having an outwardly extending guide rail configured to be operatively disposed in the at least one channel; and at least one metal brake clip configured to be disposed in the at least one channel of the anchor bracket between the anchor bracket and the at least one brake pad of the disc brake assembly, the brake clip having at least one tab extending therefrom which is configured to initially contact the guide rail and prevent the at least one brake pad from falling free prior to installation of the disc brake assembly on a vehicle.

According to this embodiment, after installation of the disc brake assembly on the vehicle the at least one tab is configured to be one of removed or deformed so as not affect the performance of the disc brake assembly.

According to this embodiment, the channel has a generally U-shaped portion and the at least one brake clip has a complimentary generally U-shaped portion.

According to this embodiment, the at least one tab extends from the generally U-shaped portion of the at least one brake clip.

According to this embodiment, the at least one brake clip includes at least one retention member provided thereon, the at least one retention member being configured to engage a portion of the anchor bracket to assist in securing the at least one brake clip to the anchor bracket.

According to this embodiment, the at least one tab of the at least one brake clip is formed integral with the at least brake clip.

According to this embodiment, the anchor bracket has a pair of channels, the at least one brake pad includes a pair of outwardly extending guide rail configured to be operatively disposed in the pair of channels, and a metal brake clip is configured to be disposed in the pair of channels of the anchor bracket between the anchor bracket and the at least one brake pad of the disc brake assembly, each of the brake clips having at least one tab extending therefrom which is configured to initially contact the guide rails and prevent the at least one brake pad from falling free prior to installation of the disc brake assembly on a vehicle and wherein after installation of the disc brake assembly on the vehicle the at least one tab is configured to be deformed by the guide rails as the brake pad wears so as not affect the performance of the disc brake assembly.

According to yet another embodiment, a brake clip configured to be disposed between an anchor bracket and at least one brake pad of the disc brake assembly may comprise, individually and/or in combination, one or more of the following features: a brake clip having at least one tab extending therefrom which is configured to initially contact and prevent the at least one brake pad from falling free prior to installation of the disc brake assembly on a vehicle.

According to this embodiment, after installation of the disc brake assembly on the vehicle the at least one tab is configured to be one of removed or deformed so as to not affect the performance of the disc brake assembly.

According to this embodiment, the at least one brake clip has a generally U-shaped portion configured to be disposed in a complimentary generally U-shaped portion of the anchor bracket.

According to this embodiment, the at least one brake clip includes at least one retention member provided thereon, the at least one retention member being configured to engage a portion of the anchor bracket to assist in securing the at least one brake clip to the anchor bracket.

Other advantages of this invention will become apparent to those skilled in the art from the following detailed description of the preferred embodiments, when read in light of the accompanying drawings.

BRIEF DESCRIPTION OF THE DRAWINGS

FIG. 6 is another view of one of the brake clips illustrated in FIG. 3.

FIG. 7 is a view taken along line 7-7 of FIG. 6.

DETAILED DESCRIPTION OF THE PREFERRED EMBODIMENTS

Figure 1:
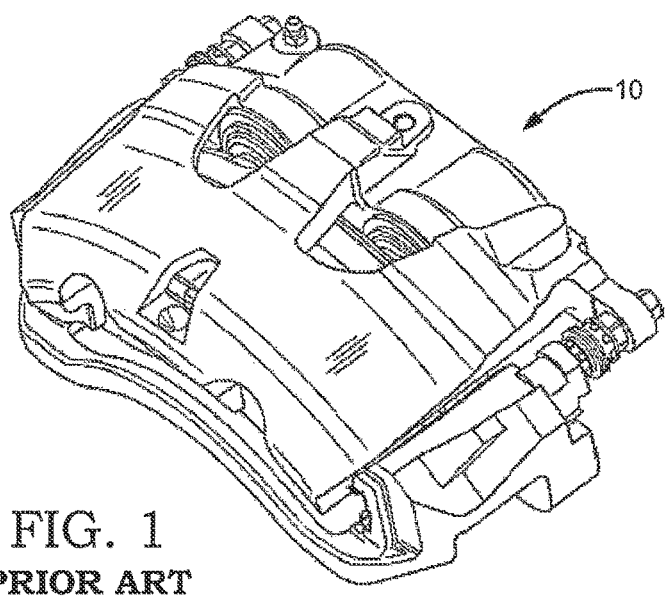
FIG. 1 is a perspective view of a prior art disc brake assembly.

Referring now to the drawings, there is illustrated in FIG. 1 a portion of a prior art disc brake assembly, indicated generally at 10, for applying braking friction or braking force to a brake rotor (not shown) of a vehicle (not shown). The general structure and operation of the prior art disc brake assembly 10 is conventional in the art. Thus, only those portions of the prior art disc brake assembly 10 that are necessary for a full understanding of this invention will be explained and illustrated.

Figure 2:
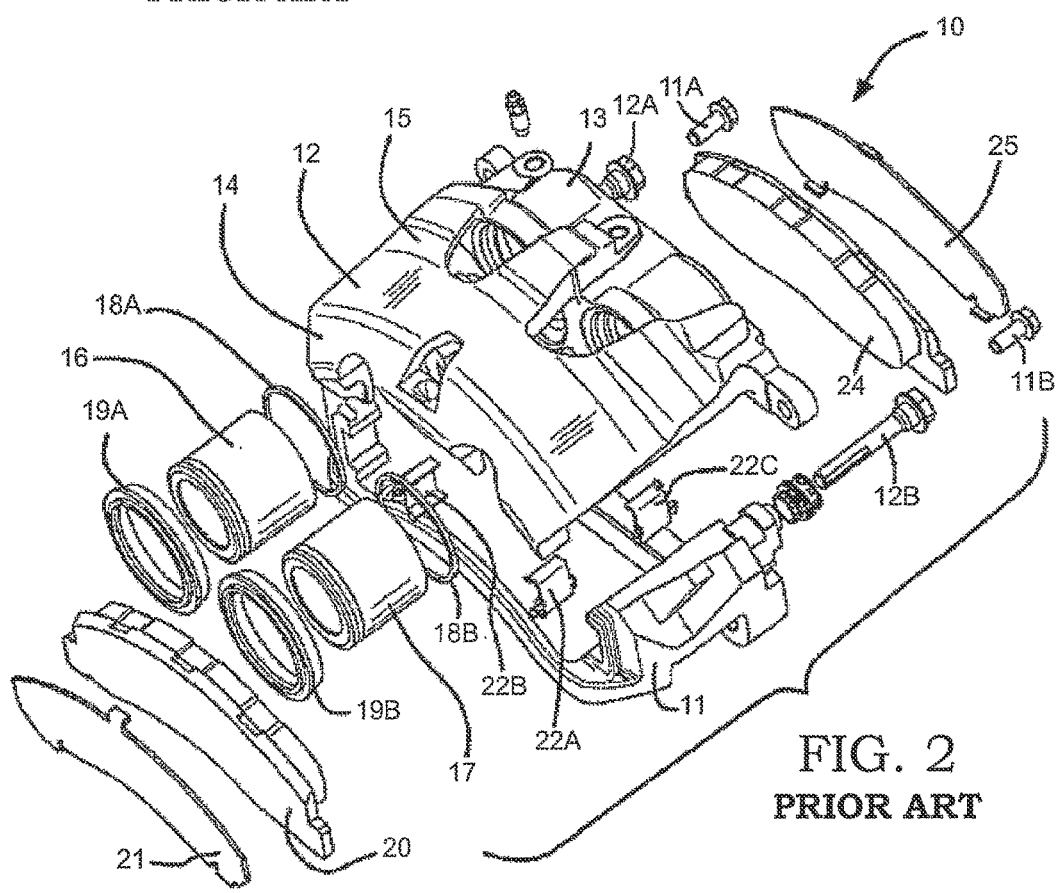
FIG. 2 is an exploded perspective view of the prior art disc brake assembly illustrated in FIG. 1.

FIG. 2 illustrates an exploded view of the prior art disc brake assembly 10. The prior art disc brake assembly 10 includes a caliper assembly which typically includes an anchor bracket 11 and a caliper 12. The caliper 12 is slidably supported relative to the anchor bracket 11 by a pair of pins 12A and 12B. The caliper 12 can be secured to the guide pins 12A and 12B by a pair of guide pin bolts 11A and 11B, respectively. The anchor bracket 11 is, in turn, secured to a stationary component of the vehicle, such as for example an axle flange (not shown) or a steering knuckle (also not shown) by a pair of mounting bolts (not shown). The caliper 12 includes an inboard or inner section 13 and an outboard or outer section 14 connected by a bridge section 15. A pair of hydraulic actuators, namely a first piston 16 and a second piston 17 connect to hydraulic ports (not shown) of the inner section 13.

A first seal 18A and a second seal 18B are disposed between the first piston 16 and the second piston 17 and their respective hydraulic ports for creating a sealed surface between the hydraulic ports and first and second pistons 16 and 17. A first dust seal 19A and a second dust seal 19B are coupled to exposed ends of the first piston 16 and the second piston 17, respectively. The first dust seal 19A and the second dust seal 19B prevent dust and other contaminants from forming on the end portions of the first and second pistons 16 and 17.

An outer brake pad 20 and an outer "noise" insulator 21 are supported by the anchor bracket 11. A first clip 22A and a second clip 22B are adapted to mate with end portions of the outer brake pad 20. The first clip 22A and second clip 22B assist in retaining the outer brake pad 20 to the anchor bracket 11 in addition to preventing rattle of the outer brake pad 20.

An inner brake pad 24 and an inner "noise" insulator 25 are also supported by the anchor bracket 11. A third clip 22C and a fourth clip (not shown) are adapted to mate with end portions of the inner brake pad 24. The third clip 22C and fourth clip assist in retaining the inner brake pad 24 to the anchor plate 11 in addition to preventing rattle of the inner brake pad 24.

During actuation, pressurized fluid is forced against the first piston 16 and second piston 17, the inner brake pad 24 is urged against the brake rotor (not shown) for applying a braking or friction force to the rotor. An inward force is also applied by the caliper 12 to the outer brake pad 20 for urging the outer brake pad 20 against the brake rotor for applying a friction force to the rotor. The structure and operation of the disc brake assembly 10 thus far described is conventional in the art.

Figure 3:
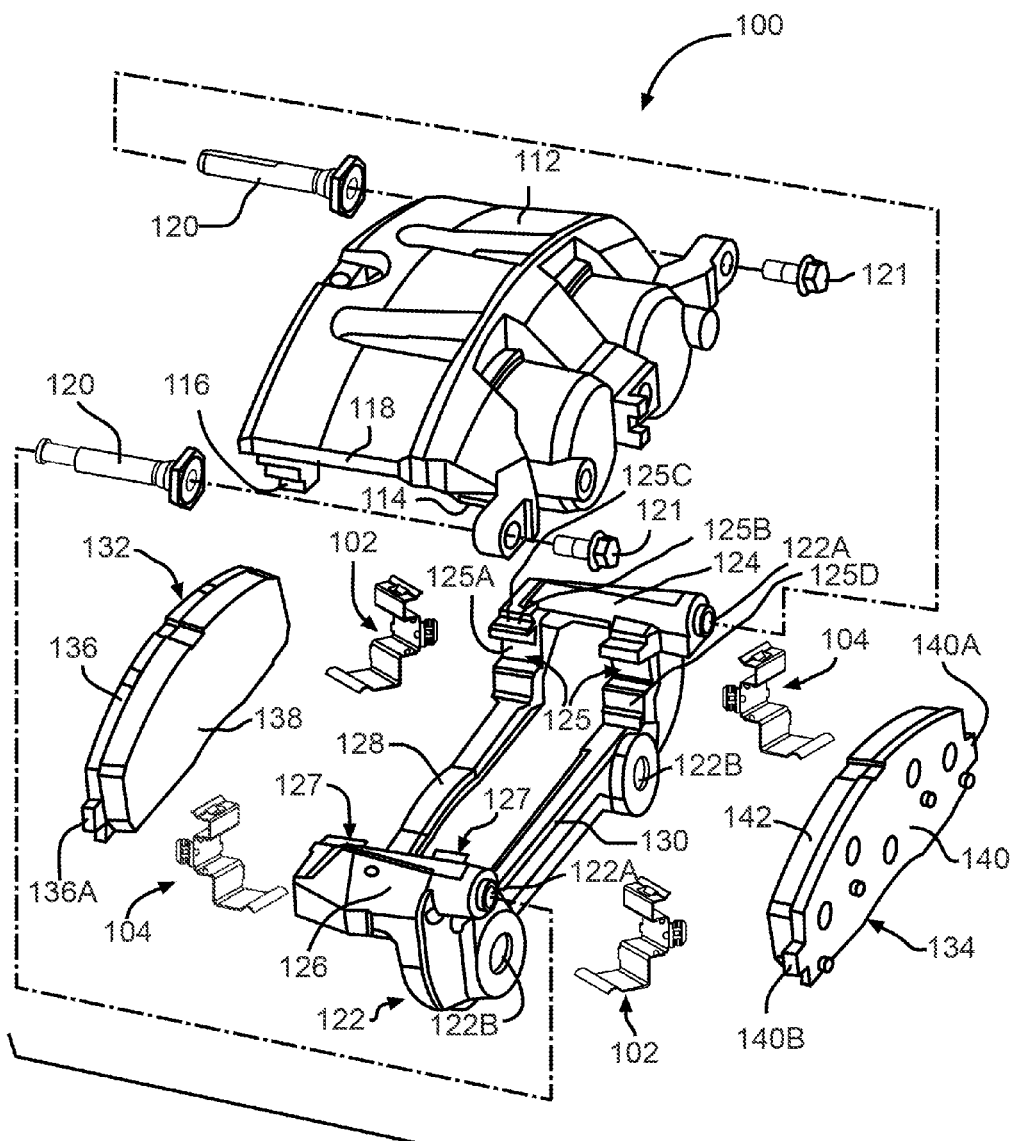
FIG. 3 is an exploded perspective view of selected components of a disc brake assembly including a plurality of brake clips in accordance with an embodiment of the present invention.

Referring now to FIG. 3, there is illustrated a exploded perspective view of selected components of a disc brake assembly, indicated generally at 100, including a first pair of brake clips 102 and a second pair of brake clips 104, shown in an uninstalled position thereon, in accordance with an embodiment of the present invention. The disc brake assembly 100 that is illustrated in FIG. 3 is a well known "Colette" sliding type of disc brake assembly. The general structure and operation of the disc brake assembly 100 is conventional in the art. Thus, only those portions of the disc brake assembly 100 which are necessary for a full understanding of this invention will be explained and illustrated in detail. Also, although this invention will be described and illustrated in connection with the particular disc brake assembly 100 disclosed herein, it will be appreciated that this invention may be used in connection with other types of disc brake assemblies. For example, the invention may be used in conjunction with other single piston, twin piston, single opposed piston and twin opposed piston disc brake assemblies, such as shown for example in U.S. Pat. No. 7,784,591 to Franz et al. and co-pending U.S. patent application Ser. No. 13/359,124, the disclosure of which are incorporated by reference herein in entirety.

As shown therein, in the illustrated embodiment the disc brake assembly 100 includes a generally C-shaped caliper 112, an anchor bracket 122, and a pair of brake pads 132 and 134. The disc brake assembly 100 is illustrated as being adapted for use on a front left wheel of a vehicle, although such is not required.

In the illustrated embodiment, the caliper 112 includes an inner section 114 and an outer section 116 that are connected by a bridge section 118. The illustrated caliper 112 is slidably supported to the anchor bracket 122 by a pair of guide pins 120 that extend into the anchor bracket 122. The caliper 112 can be secured to the guide pins 120 by a pair of guide pin bolts 121. The anchor bracket 122 is, in turn, secured to a stationary component of a vehicle, such as for example an axle flange (not shown) or a steering knuckle (also not shown) by suitable means.

In the illustrated embodiment, the anchor bracket 122 includes a first pair of spaced apart non-threaded openings or blind holes 122A, and a second pair of spaced apart threaded openings 122B. The openings 122A are each adapted to receive one of the associated guide pins 120, and the openings 122B are each adapted to receive a mounting bolt (not shown). The mounting bolts extend through the openings 122B and are received in threaded openings provided in the stationary vehicle component (not shown), thereby securing the anchor bracket 122 to the stationary vehicle component. Alternatively, other known securing methods can be used to secure the brake caliper 112 to the anchor bracket 122 and/or to secure the anchor bracket 122 to the stationary vehicle component if so desired.

In the illustrated embodiment, the anchor bracket 122 includes a pair of axially and outwardly extending arms 124 and 126 that are interconnected at their outboard ends by an "outer" tie bar 128 and interconnected at their inboard ends by an "inner" tie bar 130. In this embodiment, the arm 126 is at the "leading" end of the disc brake assembly 100 and the arm 124 is at the "trailing" end of the disc brake assembly 100. Alternatively, the anchor bracket 122 can be constructed to include only one of the inner tie bar 130 or the outer tie bar 128 if so desired.

Each of the arms 124 and 126 respectively includes a pair of spaced apart notches or channels, indicated generally at 125 and 127, formed therein (only channels 125 are clearly shown, but channels 127 are preferably identical to the channels 125). In particular, the pair of channels 125 are provided on the inner wall of arm 124 and are parallel to one another, and the pair of channels 127 are provided on the inner wall of arm 126 and are parallel to one another. The channels 125 and 127 slidably support the outboard brake pad 132 and the inboard brake pad 134 having the brake clips 102 and 104 assembled therewith, as will be explained below. Thus, in the illustrated embodiment the channels 125 and 127 are adapted to receive the associated brake clips 102 and 104 prior to assembly of the brake pads 132 and 134 to the anchor bracket 122.

In the illustrated embodiment, the outboard brake pad 132 includes a backing plate 136 and a friction pad 138. The outboard backing plate 136 includes opposite ends having outwardly projecting guide rails 136A (only one guide rail is shown) formed thereon. The guide rails 136A are configured to support the outboard brake pad 132 for sliding movement within the channels 125 and 127 of the anchor bracket 122.

Similarly, in the illustrated embodiment the inboard brake pad 134 includes a backing plate 140 and a friction pad 142. The inboard backing plate 140 includes opposite ends having outwardly projecting guide rails 140A and 140B formed thereon. The guide rails 140A and 140B are configured to support the inboard brake pad 134 for sliding movement within the channels 125 and 127 of the anchor bracket 122. Alternatively, in another non-illustrated embodiment, the outboard brake pad 132 can be supported on an associated brake piston(s) of the disc brake assembly 100 while the inboard brake pad 134 can be supported on the inboard leg portion 116 of the caliper 112. In the illustrated embodiment, the guide rails 136A, 140A, and 140B each preferably have a generally rectangular cross sectional shape, although such is not required.

Figure 4:
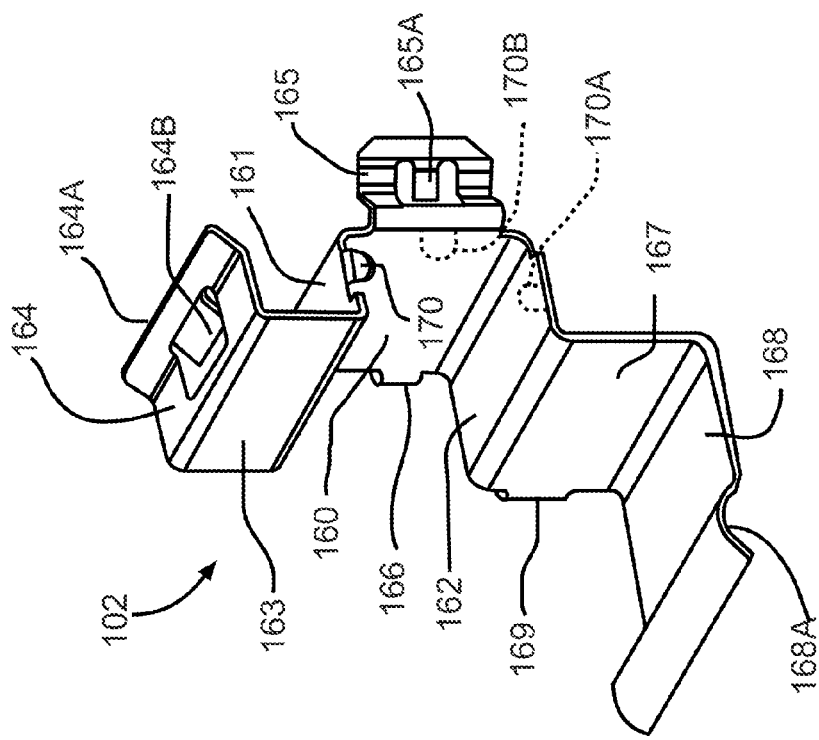
FIG. 4 is a perspective view of one of the brake clips illustrated in FIG. 3 prior to installation.
Figure 5:
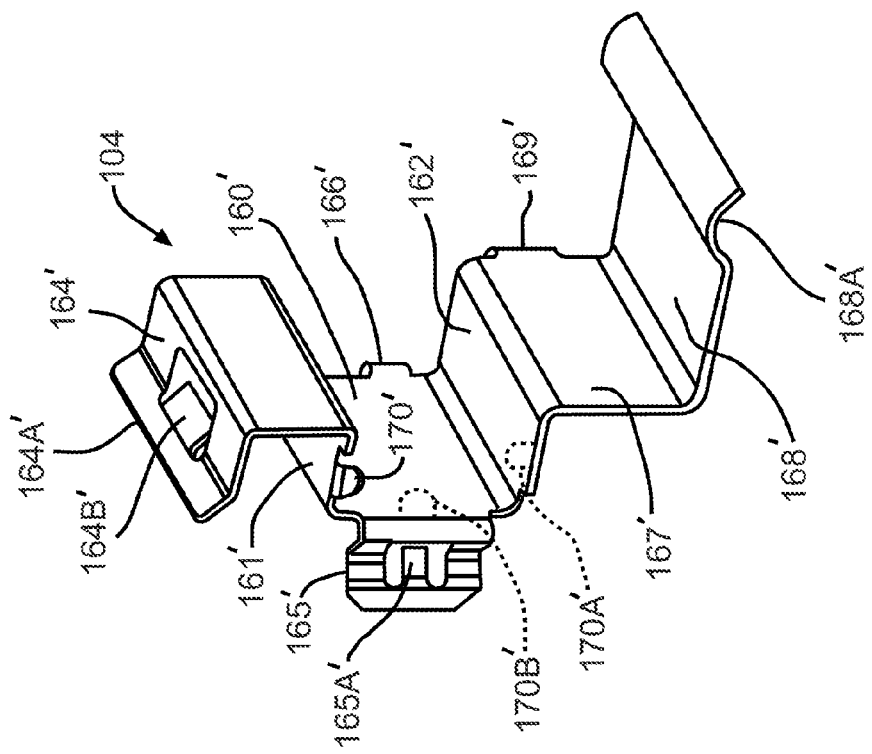
FIG. 5 is a perspective view of another one of the brake clips illustrated in FIG. 3 prior to installation.
Figure 8:
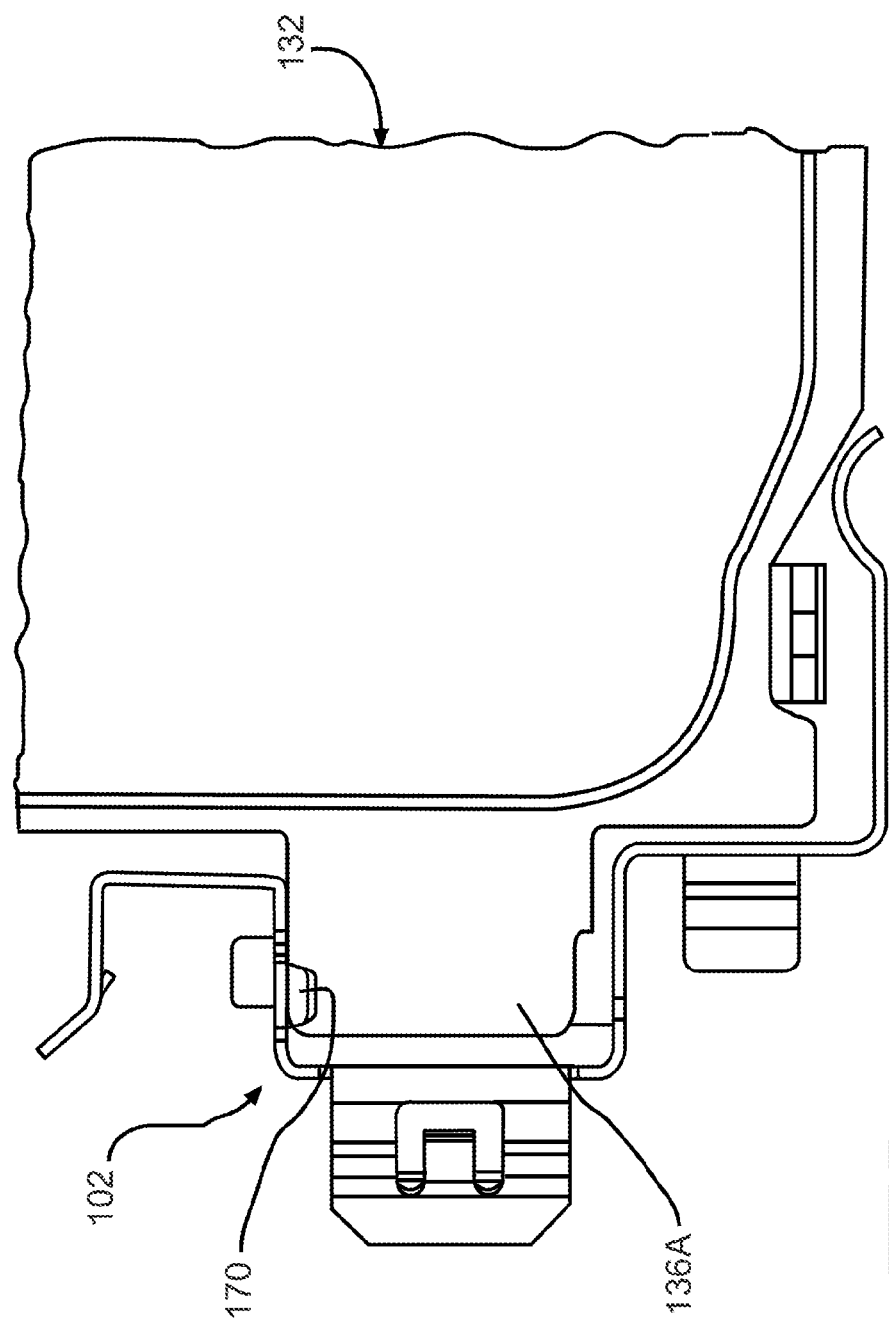
FIG. 8 is a view of one of the brake clips illustrated in FIG. 3 installed on one of the brake pads illustrated in FIG. 3.

Referring now to FIGS. 4 and 5, the structure of the brake clips 102 and 104 will be described. It should be appreciated that the pairs of channels 125 and 127 can be identical to one another and, similarly, the pair of brake clips 102 and 104 can be identical "mirror images" to one another, although such is not required. Accordingly, only one pair of the brake clips 102 and 104, namely brake clip 102, will be described herein below; however, the clip 104 shown in FIG. 4 has the same reference numbers as the clip 102 shown in FIG. 5 except that in FIG. 4 a "'" has been added to all of the associated reference numbers. Also, the brake clips 102 and 104 are preferably formed out of a metal material by a suitable process, such as for example stamping; however, one or both of the clips 102 and 104 can be made from other suitable materials, metal and non-metal materials and/or can be made by other suitable processes, if so desired.

In the illustrated embodiment shown in one or more of FIGS. 5-8, the brake clip 102 includes a generally U-shaped section having a substantially flat first base leg 160. A first or upper leg 161 and a second or lower leg 162 extend outwardly in a generally perpendicular manner from opposing edges of the first base leg 160. The upper leg 161 and the lower leg 162 are substantially flat structures that are generally parallel with one another and perpendicular with the first base leg 160, thereby forming a rectangular shape that generally corresponds with the shape of the channel 125, although such is not required. As such, in the illustrated embodiment when the brake clip 102 is installed on the anchor bracket 122, the base leg 160 extends along and is seated against a rear or back surface 125A of the channel 125.

A second base leg 163 extends generally perpendicular to the first leg 161 and an upper extension leg 164 extends generally perpendicular to the second base leg 163 and generally parallel to the upper leg 161 to form a generally rectangular shape that generally corresponds with the shape of an upper or top portion 125B of the channel 125.

The upper extension leg 164 has a curved upwardly or angled end portion 164A and has an opening formed therein to thereby preferably provide a retention member or tab 164B. The retention tab 164A is a resilient member that extends downwardly from surface of the upper leg 164. As shown, the retention tab 164B is an elongated, rectangular shaped tab that is respectively attached along one side thereof to the upper extension leg 164. It should be appreciated that the retention tab 164B can be formed by a punching or stamping operation or, alternatively, may be a separate component that is secured thereto if so desired. In operation, when the brake clip 102 is installed on the anchor bracket 122, the retention tab 164B extends into a surface or into a groove which is formed in an upper surface 125C of an upper portion of the channel 125 to thereby positively secure the brake clip 102 to the anchor bracket 122.

In the illustrated embodiment, the brake clip 102 preferably includes at least one or more of retaining members 165, 166 and 169. The retaining members 165 and 166 are preferably resilient projections that extend rearward from opposite sides of the base leg 160. Similarly, the retaining member 169 is preferably a resilient projection that extends rearward from a side of the third base leg 167. It should be appreciated that the retention members 165, 166 and 169 can be formed by a stamping operation or, alternatively, may be separate components that are secured thereto if so desired. Either or more than one of the retaining members 165, 166 and 169 may include a lip, a protrusion, or any other structural features that are configured to engage the anchor bracket 122 and secure the brake clip 102 thereto. For example, the illustrated retaining member 165 preferably includes a "punch-out" tab 165A. In operation, when the brake clip 102 is installed on the anchor bracket 122, the retaining members 165, 166 and 169 extend along and engage side surfaces, respectively, of the anchor bracket 122 to thereby assist in securing the brake clip 102 to the anchor bracket 122.

In the illustrated embodiment, the third base leg 167 extends generally perpendicular to the lower leg 162 and includes a lower extension leg 168 which extends generally perpendicular to the third base leg 167 to form a generally L-shape that generally corresponds with the shape of a lower portion of the channel 125. In the illustrated embodiment, the lower leg extension 168 preferably includes a curved "half-rolled" end portion 168A to thereby preferably provide a "smooth" contact surface to the associated brake pad 132.

In the illustrated embodiment, the brake clip 102 preferably further includes a brake pad retention member or tab 170 provided on the upper leg 161 thereof. In the illustrated embodiment, the tab 170 is preferably formed integral with the associated brake clip and therefore from the same material as the brake clip and is formed by a suitable process, such as for example a punching or stamping operation. Alternatively, the tab 170 could be formed separate from the associated brake clip and/or formed from a material different from the associated brake clip and secured thereto by suitable means, if so desired. For example, the tab 170 could be formed as a plastic molded cap which is slid over a male portion of the brake clip and which is pushed off or removed by the brake pad and/or the backing plate of the brake pad after installation of the disc brake assembly on the vehicle as will be discussed below in detail.

In operation, when the brake clip 102 is installed on the anchor bracket 122 and prior to installation of the disc brake assembly 100 on the vehicle, the tab 170 prevents the associated brake pad 132 from falling free and out of its installed position on the anchor bracket 122 and into the open space created by the brake rotor not being present. In the illustrated embodiment preferably each of the brake clips 102 and 104 includes the tab 170; however, only one or more of the brake clips 102 and/or 104 could be provided with the tab 170, if so desired.

In the illustrated embodiment, the tab 170 is preferably formed and designed to yield or deform so as not to affect brake performance. In other words, the tab 170 will initially prevent the associated brake pad 132 from falling free prior to assembly but will deform as the brake pad 132 wears as occurs near the end of the useful life thereof and the tab 170 is engaged or contacted by the brake pad 132 (i.e., the tab 170 is engaged by the guide rail 136A of the backing plate 136 of the brake pad 132). Alternatively, the construction, configuration, and/or shape of the brake clip 102 (and/or the brake clip 104), including in particular the construction, configuration, and/or shape of the tab 170, can be other than illustrated and described. For example, the brake clip 102 (and/or the brake clip 104), can be of a different construction depending upon the particular construction of the associated guide rails of the disc brake assembly. Also, the brake clip can be used in other types or kinds of disc brake assemblies, which use such a brake clip, such as for example in a disc brake assembly having an integrated parking brake (IPB) caliper and an electric parking brake (EPB) caliper.

Also, the brake clip 102 may include more than one tab 170, may include a tab or tabs on one or more legs or portions thereof, such as shown in phantom in FIG. 5 at 170A and 170B. In addition, the tab 170 can be formed by different structures and/or members than that which is illustrated and described so long as the function and operation provided thereby is the same as the tab 170. For example, in place of the tab 170 and/or in addition thereto, an indentation, punch-out tab, dimple, semi-pierce hole, and/or other suitable member(s) can be provided on one or more legs or portions of the associated brake clip 102 which is configured to initially prevent the brake pad 132 from falling free prior to installation of the disc brake assembly 100 on the vehicle but which after installation of the disc brake assembly 100 on the vehicle will yield or deform as the brake pad 132 wears as occurs near the end of the useful life thereof so as not affect the performance of the associated disc brake assembly 100.

In addition to the tab 170 yielding or in place thereof, the tab 170 can be manually removed/broken off following installation of the disc brake assembly 100 on the vehicle by, if so desired. In this embodiment, it may be preferable to put a "break apart feature", such as a notch, indentation or similar "frangible/fracturable" feature, at the desired break apart or separation area or line of the tab 170 from the associated brake clip. Furthermore, the tab 170 can be positioned on the brake clip 102 and 104 such that the tab 170 is engaged or contacted by the brake pad 132 itself, (i.e., the tab 170 is engaged by the friction material of the brake pad 132 (not shown) instead of the guide rail 136A of the backing plate 136 of the brake pad 132 as shown). In this embodiment, the tab 170 can be manually removed/broken off following installation of the disc brake assembly 100 on the vehicle by, if so desired, or can be "fractured" or removed by the application of the brakes, wherein the tab is "squeezed" between the brake rotor and the brake pad 132 and thus fractured or removed, if so desired.

In accordance with the provisions of the patent statutes, the principle and mode of operation of this invention have been described and illustrated in its preferred embodiment. However, it must be understood that the invention may be practiced otherwise than as specifically explained and illustrated without departing from the scope or spirit of the attached claims.

What is claimed is:

1. A disc brake assembly comprising:
   an anchor bracket configured to be secured to a component of a vehicle;
   at least one brake pad configured to be carried by the anchor bracket; and
   at least one brake clip configured to be disposed between the anchor bracket and the at least one brake pad of the disc brake assembly, the brake clip having at least one tab extending from a portion thereof, wherein the at least one tab is adjacent a brake rotor when the disc brake assembly is installed on a vehicle and is spaced apart from engagement or contact with the brake pad until brake pad wear occurs and the brake pad nears an end of a useful life thereof, the at least one tab configured to initially contact and prevent the at least one brake pad from falling free and out of an installed position on the anchor bracket and into an open space created by the brake rotor not being present prior to installation of the disc brake assembly on the vehicle and wherein after installation of the disc brake assembly on the vehicle the at least one tab is configured to be one of removed or, as the brake pad wears and nears the end of the useful life thereof, the at least one tab is then engaged or contacted by the brake pad and deformed thereby not affecting the performance of the disc brake assembly, wherein when deformed the at least one tab is configured to be spaced apart from contact with the rotor.

2. The disc brake assembly of claim 1 wherein the at least one brake pad includes a backing plate and the at least one tab is configured to initially contact a portion of the backing plate to prevent the at least one brake pad from falling free prior to installation of the disc brake assembly on a vehicle and wherein after installation of the disc brake assembly on the vehicle the at least one tab is configured to be contacted by the portion of the backing plate and be deformed thereby as the brake pad wears and nears the end of the useful life thereof thereby not affecting the performance of the disc brake assembly.

3. The disc brake assembly of claim 1 wherein the anchor bracket includes a channel and the at least one brake clip is disposed in the channel of the anchor bracket.

4. The disc brake assembly of claim 3 wherein the channel has a generally U-shaped portion and the at least one brake clip has a complimentary generally U-shaped portion.

5. The disc brake assembly of claim 4 wherein the at least one tab extends from the generally U-shaped portion of the at least one brake clip.

6. The disc brake assembly of claim 1 wherein the at least one brake clip includes at least one retention member provided thereon, the at least one retention member being configured to engage a portion of the anchor bracket to assist in securing the at least one brake clip to the anchor bracket.

7. The disc brake assembly of claim 1 wherein the at least one brake pad includes a backing plate having an outwardly extending guide rail and the at least one tab is configured to initially contact a portion of the guide rail of the backing plate to prevent the at least one brake pad from falling free prior to installation of the disc brake assembly on a vehicle and wherein after installation of the disc brake assembly on the vehicle the at least one tab is configured to be contacted by the portion of the guide rail backing plate and be deformed thereby as the brake pad wears and nears the end of the useful life thereof thereby not affecting the performance of the disc brake assembly.

8. The disc brake assembly of claim 1 wherein the at least one brake pad includes a pair of the brake clips disposed between the anchor bracket and the at least one brake pad of the disc brake assembly, each of the pair of brake clips having at least one tab extending therefrom which is configured to initially contact and prevent the at least one brake pad from falling free prior to installation of the disc brake assembly on a vehicle and wherein after installation of the disc brake assembly on the vehicle the at least one tab is configured to be deformed as the brake pad wears and nears the end of the useful life thereof thereby not affecting the performance of the disc brake assembly.

9. The disc brake assembly of claim 1 wherein the brake clip is a singular brake clip and configured to be disposed between at least only one of a pair of guide rails of the at least one brake pad and the anchor bracket.

10. The disc brake assembly of claim 1 wherein the at least one tab is a flat, planar tab.

11. The disc brake assembly of claim 1 wherein when deformed the at least one tab moves in a radial direction relative to an axis defined by the anchor bracket and the at least one brake pad of the disc brake assembly.

12. A disc brake assembly comprising:
    an anchor bracket configured to be secured to a component of a vehicle, the anchor bracket having at least one channel;
    at least one brake pad configured to be carried by the anchor bracket, the at least one brake pad having an outwardly extending guide rail configured to be operatively disposed in the at least one channel; and
    at least one metal brake clip configured to be disposed in the at least one channel of the anchor bracket between the anchor bracket and the at least one brake pad of the disc brake assembly, the brake clip having at least one tab extending from a portion thereof, wherein the at least one tab is adjacent a brake rotor when the disc brake assembly is installed on a vehicle and is spaced apart from engagement or contact with the brake pad until brake pad wear occurs and the brake pad nears an end of a useful life thereof, the at least one tab configured to initially contact and prevent the at least one brake pad from falling free and out of an installed position on the anchor bracket and into an open space created by the brake rotor not being present prior to installation of the disc brake assembly on the vehicle and wherein after installation of the disc brake assembly on the vehicle the at least one tab is configured to be one of removed or, as the brake pad wears and nears the end of the useful life thereof, the at least one tab is then engaged or contacted by the brake pad and deformed thereby not affecting the performance of the disc brake assembly, wherein when deformed the at least one tab is configured to be spaced apart from contact with the rotor.

13. The disc brake assembly of claim 12 wherein the channel has a generally U-shaped portion and the at least one brake clip has a complimentary generally U-shaped portion.

14. The disc brake assembly of claim 13 wherein the at least one tab extends from the generally U-shaped portion of the at least one brake clip.

15. The disc brake assembly of claim 12 wherein the at least one brake clip includes at least one retention member provided thereon, the at least one retention member being configured to engage a portion of the anchor bracket to assist in securing the at least one brake clip to the anchor bracket.

16. The disc brake assembly of claim 12 wherein the at least one tab of the at least one brake clip is formed integrally with the at least one brake clip.

17. The disc brake assembly of claim 12 wherein the anchor bracket has a pair of channels, the at least one brake pad includes a pair of outwardly extending guide rail configured to be operatively disposed in the pair of channels, and a metal brake clip is configured to be disposed in the pair of channels of the anchor bracket between the anchor bracket and the at least one brake pad of the disc brake assembly, each of the brake clips having at least one tab extending therefrom which is configured to initially contact the guide rails and prevent the at least one brake pad from falling free prior to installation of the disc brake assembly on a vehicle and wherein after installation of the disc brake assembly on the vehicle the at least one tab is configured to be deformed by the guide rails as the brake pad wears and nears the end of the useful life thereof thereby not affecting the performance of the disc brake assembly.

18. The disc brake assembly of claim 12 wherein the brake clip is a singular brake clip and configured to be disposed between at least only one of a pair of guide rails of the at least one brake pad and the anchor bracket.

19. The disc brake assembly of claim 12 wherein the at least one tab is a flat, planar tab.

20. The disc brake assembly of claim 12 wherein when deformed the at least one tab moves in a radial direction relative to an axis defined by the anchor bracket and the at least one brake pad of the disc brake assembly.

21. A brake clip adapted for use in a disc brake assembly comprising:

the brake clip configured to be disposed between an anchor bracket and at least one brake pad of the disc brake assembly, the brake clip having at least one tab extending from a portion thereof, wherein the at least one tab is adjacent a brake rotor when the disc brake assembly is installed on a vehicle and is spaced apart from engagement or contact with the brake pad until brake pad wear occurs and the brake pad nears an end of a useful life thereof, the at least one tab configured to initially contact and prevent the at least one brake pad from falling free and out of an installed position on the anchor bracket and into an open space created by the brake rotor not being present prior to installation of the disc brake assembly on the vehicle and wherein after installation of the disc brake assembly on the vehicle the at least one tab is configured to be one of removed or, as the brake pad wears and nears the end of the useful life thereof, the at least one tab is then engaged or contacted by the brake pad and deformed thereby not affecting the performance of the disc brake assembly, wherein when deformed the at least one tab is configured to be spaced apart from contact with the rotor.

22. The brake clip of claim 21 wherein the brake clip has a generally U-shaped portion configured to be disposed in a complimentary generally U-shaped portion of the anchor bracket.

23. The brake clip of claim 21 wherein the brake clip includes at least one retention member provided thereon, the at least one retention member being configured to engage a portion of the anchor bracket to assist in securing the clip to the anchor bracket.

24. The brake clip of claim 21 wherein the brake clip is a singular brake clip and configured to be disposed between at least only one of a pair of guide rails of the at least one brake pad and the anchor bracket.

25. The brake clip of claim 21 wherein the at least one tab is a flat, planar tab.

26. The brake clip of claim 21 wherein when deformed the at least one tab moves in a radial direction relative to an axis defined by the anchor bracket and the at least one brake pad of the disc brake assembly.

* * * * *